United States Patent
Laengler

(10) Patent No.: US 9,784,109 B2
(45) Date of Patent: Oct. 10, 2017

(54) EXHAUST-GAS TURBOCHARGER HAVING HEAT THROTTLE CAVITY

(71) Applicant: BorgWarner Inc., Auburn Hills, MI (US)

(72) Inventor: Frank Laengler, Wiesbaden (DE)

(73) Assignee: BorgWarner Inc., Auburn Hills, MI (US)

( * ) Notice: Subject to any disclaimer, the term of this patent is extended or adjusted under 35 U.S.C. 154(b) by 448 days.

(21) Appl. No.: 14/383,159

(22) PCT Filed: Mar. 6, 2013

(86) PCT No.: PCT/US2013/029238
§ 371 (c)(1),
(2) Date: Sep. 5, 2014

(87) PCT Pub. No.: WO2013/138120
PCT Pub. Date: Sep. 19, 2013

(65) Prior Publication Data
US 2015/0030451 A1   Jan. 29, 2015

(30) Foreign Application Priority Data

Mar. 15, 2012   (DE) .................. 10 2012 005 278

(51) Int. Cl.
*F01D 5/02* (2006.01)
*F16D 1/068* (2006.01)
*F01D 25/08* (2006.01)

(52) U.S. Cl.
CPC ............. *F01D 5/025* (2013.01); *F01D 5/026* (2013.01); *F01D 25/08* (2013.01); *F16D 1/068* (2013.01); *F05D 2220/40* (2013.01)

(58) Field of Classification Search
CPC ...... F01D 5/025; F16D 1/076; F05D 2260/31; F05D 2220/40
See application file for complete search history.

(56) References Cited

U.S. PATENT DOCUMENTS

2015/0030455 A1* 1/2015 Loewenberg ........... F16D 1/076
                                                                    416/204 R
2015/0198043 A1* 7/2015 Striedelmeyer ......... F01D 5/025
                                                                    416/213 R

FOREIGN PATENT DOCUMENTS

JP                 03122203 U  * 12/1991

* cited by examiner

*Primary Examiner* — Ryan J Walters
(74) *Attorney, Agent, or Firm* — Eric L. Doyle; Stephan A. Pendorf; Patent Central LLC

(57) ABSTRACT

An exhaust-gas turbocharger (1) having a shaft (2), a turbine wheel (5), which is fastened to the shaft (2), and a heat throttle (8) between the shaft (2) and the turbine wheel. An end face (3) of the shaft (2) is provided with a protrusion (4), with an outside diameter ($A_4$) which is smaller than the outside diameter ($A_2$) of the shaft (2). The turbine wheel (5) has a hollow receiving portion (7), which is formed integrally on the wheel rear side (6) and the inside diameter ($I_7$) corresponds to the outside diameter ($A_4$) of the protrusion (4) and the outside diameter ($A_7$) corresponds to the outside diameter ($A_2$) of the shaft (2). The protrusion (4) engages into the receiving portion (7). The heat throttle (8) is formed by a cavity (8A, 8B), which has an outside diameter ($A_8$) which is smaller than the outside diameter ($A_4$) of the protrusion (4) and extends from the protrusion (4) into the receiving portion (7).

14 Claims, 1 Drawing Sheet

EXHAUST-GAS TURBOCHARGER HAVING HEAT THROTTLE CAVITY

BACKGROUND OF THE INVENTION

Field of the Invention

The invention relates to an exhaust-gas turbocharger.

Description of the Related Art

An exhaust-gas turbocharger of this type is known from U.S. Pat. No. 7,287,960 B2. The rotor of this known exhaust-gas turbocharger is formed by a turbine wheel having a connecting journal on the wheel rear side thereof. The connecting journal is inserted into a cavity in a shaft shoulder of the shaft of the exhaust-gas turbocharger. In this respect, it is possible to leave a clearance, which can serve as a heat throttle, between the end face of the journal and the opposite side of the cavity in the shaft shoulder. In a manner related to construction and primarily on account of the required strength of the connection between the journal and the shaft shoulder, however, this heat throttle can be formed so as to be only relatively short owing to its position between the end face and the adjacent wall of the shaft shoulder.

It is an object of the present invention, therefore, to provide an exhaust-gas turbocharger, the heat throttle of which can be dimensioned in such a manner that an excessive introduction of heat from the turbine wheel into the shaft can reliably be avoided.

BRIEF SUMMARY OF THE INVENTION

This object is achieved by the features of claim 1.

The concept-related disadvantage of the generic prior art is eliminated according to the invention in that the end face of the shaft of the rotor of the exhaust-gas turbocharger according to the invention is provided with a protrusion or journal, the outside diameter of which is smaller than the outside diameter of the shaft. The wheel rear side of the turbine wheel is provided with a receiving portion for the protrusion, the inside diameter of which receiving portion corresponds to the outside diameter of the protrusion, such that the protrusion can be introduced into the receiving portion as it were with a transition fit.

The heat throttle is in the form of a cavity which is independent of the length of the protrusion and of the receiving portion, since this cavity has an inside diameter which is smaller than the outside diameter of the protrusion and therefore can extend both in the protrusion and in the receiving portion of the turbine wheel. This makes it possible to increase the size of the cavity and therefore of the heat throttle considerably and therefore to significantly reduce the flow of heat from the turbine wheel in the direction of the shaft.

Accordingly, in the case of the exhaust-gas turbocharger according to the invention, the risk of an excessively hot shaft, combined with oil coking, can be reduced, if not avoided entirely.

Furthermore, there is the advantage that the form of the joining surface or joining seam between the protrusion and the receiving portion can be adapted depending on the strength requirement, and therefore ensures shearing stress which is suitable for adhesive bonding/soldering. Tensile and peeling stress can be avoided according to the invention.

Furthermore, there is the advantage that the turbine wheel and the shaft can be finish-machined before they are joined together, and therefore no further machining is required any more after the rotor has been assembled.

Furthermore, it is an object of the invention to provide a rotor of an exhaust-gas turbocharger as an object which can be marketed independently.

BRIEF DESCRIPTION OF THE SEVERAL VIEWS OF THE DRAWINGS

Further details, advantages and features of the present invention will become apparent from the following description of an exemplary embodiment with reference to the drawing, in which.

DETAILED DESCRIPTION OF THE INVENTION

Figure 1:
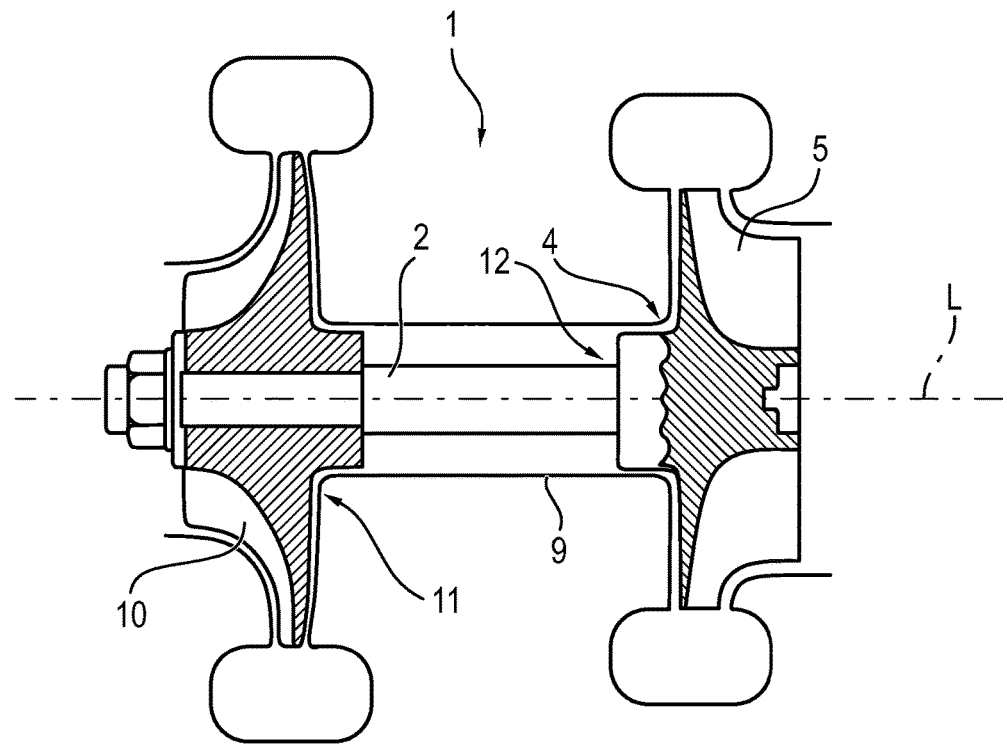
FIG. 1 shows a schematically greatly simplified basic illustration of an exhaust-gas turbocharger according to the invention.

FIG. 1 shows, in a schematically greatly simplified basic illustration, an exhaust-gas turbocharger 1 according to the invention. The exhaust-gas turbocharger 1 has a shaft 2, which is mounted in a bearing housing 12. A turbine wheel 5 of a turbine 4 is mounted at one end of the shaft 2. At the opposite end, a compressor wheel 10 of a compressor 11 is fixed to the shaft 2.

Figure 2:
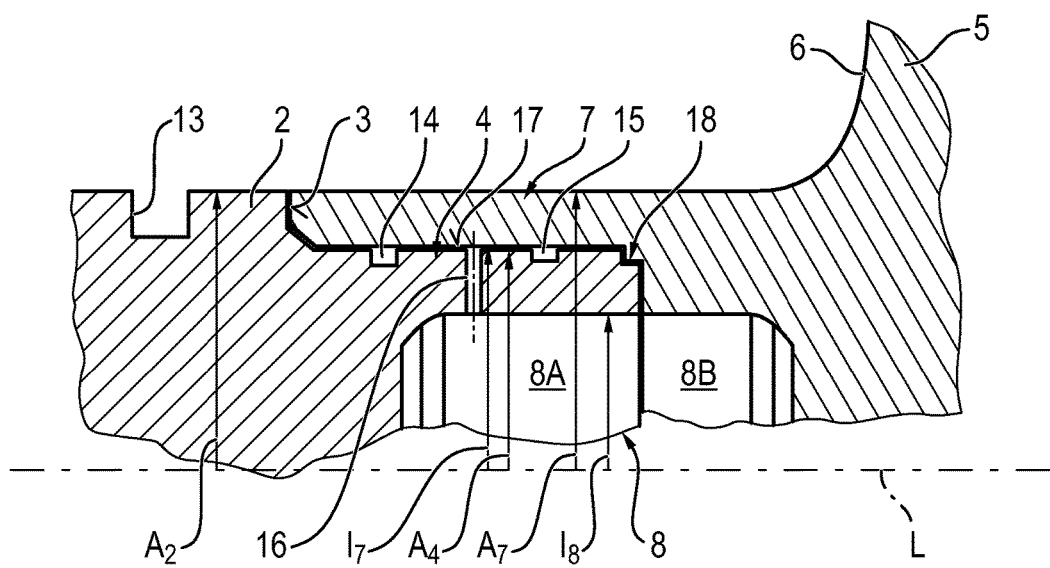
FIG. 2 shows a schematically slightly simplified illustration of the joining region between the shaft and the turbine wheel of the exhaust-gas turbocharger shown in FIG. 1.

FIG. 2 shows the joining or connecting region between the shaft 2 and the turbine wheel 5 in enlarged form. FIG. 2 shows that an end face 3 of the shaft 2 is provided with a protrusion 4, which has an outside diameter $A_4$ which is smaller than the outside diameter $A_2$ of the shaft 2.

The turbine wheel 5 has a hollow receiving portion 7 of complementary form which is formed integrally on the wheel rear side 6 thereof. The inside diameter $I_7$ of the receiving portion 7 corresponds to the outside diameter $A_4$ of the protrusion 4, i.e. it is either of the same size or slightly smaller, in order to preferably make a transition fit possible. FIG. 2 shows the assembled state of the rotor of the exhaust-gas turbocharger 1, which is formed by the shaft 2 and the turbine wheel 5. In this assembled state, the protrusion 4 is inserted into the hollow receiving portion 7. For centering purposes, a fitting surface portion 18 is provided in this respect and is formed either as a bevel or, as shown in FIG. 2, as a step and comprises surface regions of the protrusion 4 and of the receiving portion 7.

As FIG. 2 further shows, provision is made of a heat throttle 8 in the form of a cavity 8A, 8B, which has a diameter $I_8$ which is smaller than the outside diameter $A_4$ of the protrusion 4. The aforementioned inside and outside diameter dimensions are each symbolized by arrows proceeding from the longitudinal center line L outward.

The selection of the inside diameter $I_8$ makes it possible to arrange the heat throttle 8 both in the protrusion 4 and in a region of the turbine wheel 5. In the particularly preferred embodiment shown in FIG. 2, the cavity splits into two subspaces 8A and 8B, the subspace 8A being arranged in the protrusion 4 and the subspace 8B being arranged in the turbine wheel 5. This represents a particularly preferred embodiment, but it would also be possible in principle to provide such a cavity only in the protrusion 4 or only in the turbine wheel. Furthermore, it is of course also possible to adapt the cavity or the heat throttle 8 in terms of inside diameter $I_8$ and in terms of length to different mounting situations.

FIG. 2 furthermore shows that the shaft 2 has a groove 13, into which a piston ring (not shown) can be inserted, adjacent to the end face 3.

Furthermore, in the particularly preferred embodiment shown, the protrusion 4 has two grooves 14 and 15, which serve for the insertion of a form-fitting means, such as for example a soldering wire or an adhesive. In this respect, it is of course possible to provide either only one groove or else a greater number of grooves, depending on the length of a resultant joining surface region 17, between the protrusion 4 and the receiving portion 7. A ventilation bore 16 is provided in the protrusion 4, extending from the cavity 8A, 8B to the joining surface portion 17, such that air can escape during the insertion, and particularly during the joining process, of the protrusion 4 into the hollow receiving portion 7.

In addition to the above written disclosure of the invention, reference is hereby explicitly made, to supplement the disclosure thereof, to the illustrative representation in FIGS. 1 and 2.

LIST OF REFERENCE SIGNS

1 Exhaust-gas turbocharger
2 Shaft
3 End face
4 Protrusion
5 Turbine wheel
6 Wheel rear side
7 Receiving portion
8 Heat throttle
8A, 8B Cavity, consisting of subspaces 8A, 8B
9 Bearing housing
10 Compressor wheel
11 Compressor
12 Rotor
13 Groove
14, 15 Grooves
16 Ventilation bore
17 Joining surface region
18 Fitting surface portion
L Longitudinal center line of the exhaust-gas turbocharger or rotor 12
$A_2$ Outside diameter of the shaft 2
$A_4$ Outside diameter of the protrusion 4
$I_7$ Inside diameter of the receiving portion 7
$I_8$ Inside diameter of the cavity 8A, 8B

The invention claimed is:

1. An exhaust-gas turbocharger (1), having
a shaft (2), which has an outside diameter ($A_2$); and
a turbine wheel (5), which is fastened to the shaft (2);
wherein
an end face (3) of the shaft (2) is provided with a hollow protrusion (4), which comprises an outside diameter ($A_4$) which is smaller than the outside diameter ($A_2$) of the shaft (2),
the turbine wheel (5) has a hollow receiving portion (7), which is formed integrally on the wheel rear side (6) thereof and the inside diameter ($I_7$) of which corresponds to the outside diameter ($A_4$) of the protrusion (4) and the outside diameter ($A_7$) of which corresponds to the outside diameter ($A_2$) of the shaft (2), wherein the protrusion (4) engages into the receiving portion (7), and
the hollow protrusion (4) has an inside diameter ($I_8$) which is smaller than the outside diameter ($A_4$) of the protrusion (4), whereby
a cavity (8) is defined between the hollow protrusion (4) of the shaft (2) and the hollow receiving portion (7) of the turbine wheel.

2. The exhaust-gas turbocharger as claimed in claim 1, wherein the shaft (2) has a groove (13) for a piston ring adjacent to the end face (3).

3. The exhaust-gas turbocharger as claimed in claim 1, wherein the protrusion (4) has at least one groove (14, 15) for inserting a form-fitting means.

4. The exhaust-gas turbocharger as claimed in claim 3, wherein the form-fitting means is a soldering wire or an adhesive.

5. The exhaust-gas turbocharger as claimed in claim 1, further comprising a ventilation bore (16), which leads from the cavity (8) to a joining surface region (17) between the protrusion (4) and the receiving portion (7).

6. The exhaust-gas turbocharger as claimed in claim 1, further comprising a fitting surface portion (18) between the protrusion (4) and the receiving portion (7), wherein the fitting surface portion (18) is provided on the hollow protrusion (4) of the shaft (2) in the form of a step or bevel, and the hollow receiving portion (7) of the turbine wheel is provided with a complementary mating feature for centering the shaft protrusion (4) in the receiving portion (7).

7. The exhaust-gas turbocharger as claimed in claim 1, wherein the shaft (2) and the turbine wheel (5) are finish-machined before they are assembled.

8. A rotor (12) of an exhaust-gas turbocharger (1), having
a shaft (2), which has an outside diameter ($A_2$); and
a turbine wheel (5), which is fastened to the shaft (2);
wherein
an end face (3) of the shaft (2) is provided with a hollow protrusion (4), which comprises an outside diameter ($A_4$) which is smaller than the outside diameter ($A_2$) of the shaft (2),
the turbine wheel (5) has a hollow receiving portion (7), which is formed integrally on the wheel rear side (6) thereof and the inside diameter ($I_7$) of which corresponds to the outside diameter ($A_4$) of the protrusion (4) and the outside diameter ($A_7$) of which corresponds to the outside diameter ($A_2$) of the shaft (2), wherein the protrusion (4) engages into the receiving portion (7), and
the hollow protrusion (4) has an inside diameter ($I_8$) which is smaller than the outside diameter ($A_4$) of the protrusion (4), whereby
a cavity (8) is defined between the hollow protrusion (4) of the shaft (2) and the hollow receiving portion (7) of the turbine wheel.

9. The rotor as claimed in claim 8, wherein the shaft (2) has a groove (13) for a piston ring adjacent to the end face (3).

10. The rotor as claimed in claim 9, wherein the form-fitting means is a soldering wire or an adhesive.

11. The rotor as claimed in claim 8, wherein the protrusion (4) has at least one groove (14, 15) for inserting a form-fitting means.

12. The rotor as claimed in claim 8, further comprising a ventilation bore (16), which leads from the cavity (8A, 8B) to a joining surface region (17) between the protrusion (4) and the receiving portion (7).

13. The rotor as claimed in claim 8, further comprising a fitting surface portion (18) between the protrusion (4) and the receiving portion (7), wherein the fitting surface portion (18) is provided on the hollow protrusion (4) of the shaft (2) in the form of a step or bevel, and the hollow receiving portion (7) of the turbine wheel is provided with a complementary mating feature for centering the shaft protrusion (4) in the receiving portion (7).

14. The rotor as claimed in claim 8, wherein the shaft (2) and the turbine wheel (5) are finish-machined before they are assembled.

\* \* \* \* \*